July 23, 1968 E. G. HEDGER ETAL 3,394,225

FACSIMILE RECORDER EMPLOYING RECEIVED VIDEO CARRIER FOR SYNCHRONIZATION PURPOSES

Filed June 17, 1965

INVENTORS
EARL G. HEDGER
DANIEL R. LEONARD
BY
[signature]
ATTORNEYS 3,394,225

FACSIMILE RECORDER EMPLOYING RECEIVED VIDEO CARRIER FOR SYNCHRONIZATION PURPOSES

Earl G. Hedger and Daniel R. Leonard, San Diego, Calif., assignors to the United States of America as represented by the Secretary of the Navy Filed June 17, 1965, Ser. No. 464,882
6 Claims. (Cl. 178—69.5)

The invention described herein may be manufactured and used by or for the Government of the United States of America for governmental purposes without the payment of any royalties thereon or therefor.

This invention relates to an apparatus for synchronizing the speed of a facsimile recorder with respect to a signal to be recorded thereon and more particularly to apparatus for synchronizing the speed of a chart-type facsimile recorder with respect to the scanning rate of a facsimile signal from a satellite.

In the transmission and reception of facsimile signals it is essential that the receiving device of a system be in synchronism with the transmitting device, i.e., the scanning rates of the two must be equal. The usual technique for achieving such synchronism has been to provide both the transmitting and receiving station with a highly accurate local oscillator from which the scanning rate is derived. Such a technique is usually satisfactory when a wire link comprises the transmission path however, when a radio frequency link is used certain complications sometimes arise. The latter case is further complicated when the transmitting station is a moving body such as in the case of an orbiting satellite. In satellite facsimile systems such effects as fading, the doppler effect, etc. result in the loss of synchronism between the transmitter and receiver.

The Tiros/Nimbus Weather Satellite Automatic Picture Transmission (APT) system uses a facsimile readout. The facsimile recorder runs at a speed of 240 lines per minute. A conventional synchronous A-C motor whose output speed is proportional to its drive frequency is used to drive the recorder. The data from the satellite is also transmitted at a rate of 240 lines per minute and as discussed above it is imperative that the transmission rate be exactly the same as the received rate if a picture is to be successively transmitted. In the Tiros/Nimbus system the recorder speed is derived from a precision oscillator as is the transmission rate. This means that each facsimile transmitter and each facsimile recorder must have a precision oscillator and all of these precision oscillators must oscillate at the same frequency to within about four parts in $10^5$. If this is not the case the picture will be received with a noticeable skew. In the Tiros/Nimbus system for example, a frequency difference of 4 parts in $10^4$ is disasterous to picture transmission.

One of the facsimile recorders available for use with such an APT ground station has an emergency mode for use when either the local oscillator or the satellite oscillator gets off frequency. In this mode of operation the 60 cycle drive frequency for the AC drive motor is derived directly from the 2400 cycle information carrier frequency. This system works well except for times of high percentage modulation or carrier fade or drop-out. When the latter conditions occur the AC motor has no drive frequency and will not have any until the modulation percentage is reduced or the signal returns. Even when the drive frequency returns the picture will be out of phase, i.e., the picture may not begin at the left-hand edge of the recording paper.

Aside from receiving signals on a facsimile chart-type readout for instantaneous display, it is sometimes desired to first provide a reproduction of such signals in the form of a magnetic tape and later supply the facsimile readout with the recorded signals. Once again synchronism is of the utmost importance and consequently the above noted problems are present while a chart recording from a magnetic tape is made. At present the magnetic tape recorders suitable for recording and playing back such facsimile signals must be of the constant speed precision variety and consequently are quite costly. The drive motors must be driven by phase-locked-loop precision oscillators, etc., as in the case of the prior art facsimile recorders.

It is therefore an object of the present invention to provide a reliable means for synchronizing a facsimile receiver with a facsimile transmitter.

A further object of the present invention is to provide apparatus which permits facsimile signals recorded on magnetic tape to be synchronously recorded on a conventional facsimile readout.

A yet further object of the present invention is to provide apparatus which regulates the speed of a recording means in accordance with the scanning rate of an associated facsimile transmitter.

A more particular object of the present invention is to provide apparatus which controls the scanning rate of a facsimile recorder in response to the frequency of a received facsimile signal.

Still another object of this invention is to provide a device which derives a facsimile readout drive frequency from a received sub-carrier wave and continues to supply a drive frequency when the carrier fades, drops out completely, or is overcome by noise.

The instant invention achieves the above objects by comparing the frequency of a received facsimile signal with that of a variable local oscillator. If a difference exists between the two an error signal is developed which causes the local oscillator to conform to the frequency of the received signal. The local oscillator has a natural frequency which is approximately equal to the nominal value of the received signal but as long as there is an incoming signal the oscillator's frequency will be varied in accordance with the variations of said incoming signal. When the facsimile signal fades, the output of the circuit reverts to the natural frequency of the oscillator.

The above and other objects and features of the invention will be more fully understood from the following detailed description and drawings wherein.

Figure 1:
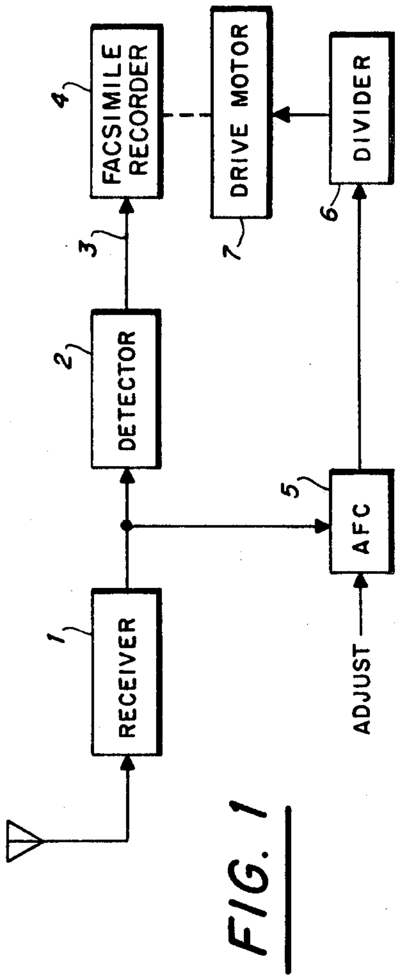
FIG. 1 is a block diagram of the overall system.

As shown in FIG. 1, the basic system comprises a receiver 1, a video detector 2, a facsimile chart recorder 4 having a data input line 3 and a drive motor 7, adjustable automatic frequency control 5, and a frequency divider 6. Receiver 1 functions to separate the video data signal from the total RF signal received, for example, from an orbiting satellite or other form of transmitting station. Consequently the output of receiver 1 is an amplitude modulated signal containing video information. In a particular embodiment constructed in accordance with this invention the video carrier had a frequency of 2400 cycles per second with maximum carrier amplitude representing white. The black level was 20 db down from the white.

It should be noted that information signal from receiver 1 may be recorded on a conventional magnetic tape recorder and later played back through the remainder of the circuit to be described.

Detector 2 functions to extract the video data from the modulated carrier signal and present it in suitable form to the data input 3 of facsimile recorder 4. Recorder 4 is a conventional facsimile chart-type recorder readout or could be other suitable facsimile readout device. Recorder 4 is driven by motor 7 which must be of the synchronous type, i.e., its rotational speed is dependent on the frequency of the drive voltage applied to it.

As mentioned above, for proper operation of the recording apparatus, it is imperative that the recording speed be synchronized with the scanning rate at the originating station. Since at the originating station, the scanning rate and the video carrier frequency are both derived from the same standard the video carrier frequency may be used for synchronization purposes at the receiving station. Therefore, by controlling the speed of the recording apparatus in accordance with the frequency of the video carrier, a synchronous recording may be made.

Automatic frequency control device 5 comprises limiter means, for removing the amplitude modulation from the video signal, frequency comparison means and a voltage controlled oscillator. The limited video carrier frequency is compared with the oscillator frequency and any difference between the two supplies a signal to the oscillator which corrects its frequency to be equal to that of the video carrier. The circuits will be described in more detail with relation to FIG. 2. Frequency divider 6 functions to reduce the oscillator frequency from AFC circuit 5 to a value suitable for driving motor 7. Since motor 7 is of the synchronous type, its speed and hence the speed of the recorder is dependent on the frequency from the output of divider 6.

Figure 2:
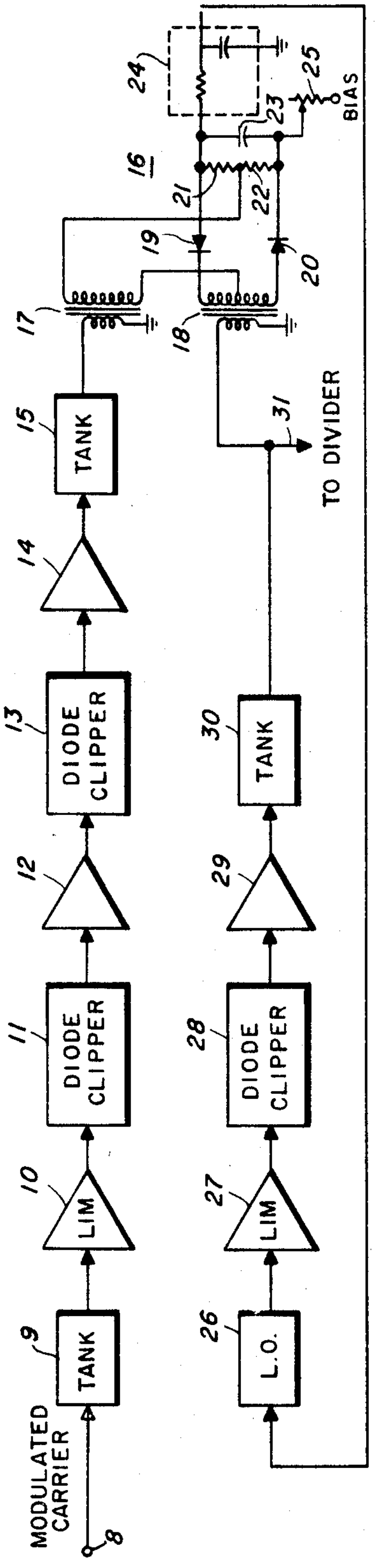
FIG. 2 is a detailed block diagram of the automatic frequency control portion of the system of FIG. 1.

FIG. 2 is essentially a detailed diagram of the elements that comprise the AFC circuit 5 of FIG. 1. The amplitude modulated video carrier is coupled to input terminal 8. Before the carrier frequency can be used for accurate comparison purposes the amplitude modulation must be removed and the resultant wave must be shaped to conform as closely as possible to a sinusoidally varying signal. Limiting amplifier 10 and diode clippers 11 and 13 function to remove the amplitude modulation from the video signal. Amplifiers 12 and 14 increase the level of the clipped signal from clippers 11 and 13, respectively, to a useable value. The tuned circuits or tanks 9 and 15 are used to shape the wave in a sinusoidal manner. Consequently a constant amplitude sinusoidal wave is available at a first broadband transformer 17 of frequency comparator or discriminator 16.

The discriminator 16 comprises first and second broadband transformers 17 and 18, respectively, diodes 19 and 20, load resistors 21 and 22, filtering capacitor 23 and filter network 24. Variable resistor 25 is used to vary the DC level or bias at the output of discriminator 16 and hence vary the natural frequency of local oscillator 26.

Local oscillator 26 is of the type whose output frequency can be varied by the amplitude of a DC bias applied to its input. A Colpitts oscillator with a voltage controlled reactance in its tuning circuit, for example, would be suitable. Limiter 27, diode clipper 28, amplifier 29 and tank circuit 30 function to insure that the signal applied to the second input transformer 18 of discriminator 16 is free from amplitude variations and is sinusoidally shaped. The output of tank 30 is also connected via line 31 to divider 6, and shown in FIG. 1.

It should be understood that the extent of limiting, clipping and amplifying shown in the embodiment of FIG. 2 could be varied in accordance with the particular application. The design of discriminator 16 is such that in the absence of a carrier frequency input to transformer 17, a DC voltage will be produced across resistors 21 and 22 which when coupled to oscillator 26 causes said oscillator to operate its predetermined or natural frequency. The natural frequency may be adjusted by varying the setting of variable resistor 25. If a carrier signal is applied through transformer 17 to the circuit, and the frequency of the carrier is equal to the frequency of the local oscillator, the DC output of the discriminator will not change. If, however, a difference exists between the carrier and the local oscillator frequency, discriminators 16 will produce a resultant DC output which will correct the local oscillator frequency to that of the carrier. Capacitor 23 and filter circuit 24 are provided to remove the AC ripple from the output of the discriminator.

It may therefore be concluded that the instant invention overcomes the inadequacies of the prior art. When a suitable carrier is being received the recorder speed is dependent thereon. Unlike the prior art, when carrier fade or dropout occurs, the system of this invention still provides the recorder with approximately the correct drive frequency. No highly critical circuits are necessary and hence the overall cost is quite low.

As mentioned above, one particular use of the instant invention is in conjunction with the NASA APT system, wherein the information carrier frequency equals 2400 c.p.s. As an example of the operation of the invention, it may be noted that it permits the reception of APT facsimile signals even when the carrier frequency varies continuously by as much as plus or minus 2%.

Furthermore, the invention makes it possible to record received facsimile signals on a conventional non-precision magnetic tape recorder for later playback through a facsimile chart readout. The quality of the tape recorder is not critical since any variations in its speed, etc. will be compensated for at playback time by the automatic control features of this invention.

While the invention has been described by means of a specific example and in a specific embodiment, it is not limited thereto, for obvious modifications will occur to those skilled in the art without departing from the spirit and scope of the invention.

What is claimed is:

1. Apparatus for controlling the speed of a facsimile recorder in response to the carrier frequency of an amplitude-modulated video signal to be recorded thereon comprising;
   - a source of amplitude-modulated carrier signal containing video information;
   - a facsimile recorder having a data input and being driven by a synchronous motor wherein the recording speed of said recorder is dependent on the rotational speed of said motor;
   - detector means for removing the video information from said amplitude-modulated carrier and supplying said information to the data input of said recorder;
   - variable-frequency local oscillator means having a natural frequency output for supplying said synchronous motor with a drive frequency; and
   - automatic control means for varying the frequency of said local oscillator around its natural frequency in response to differences between the frequency of said local oscillator and the carrier frequency from said source of signals.

2. The apparatus of claim 1 wherein said automatic control means comprises;
   - limiter means coupled to said signal source for limiting the amplitude variations of said carrier signal;
   - frequency discriminator means having two inputs and an output and wherein the output is proportional to any difference in frequency of signals applied to said inputs;
   - a first of said discriminator inputs being operatively coupled to said limiter means for receiving limited carrier signals therefrom;
   - the other of said discriminator inputs being coupled to said local oscillator output.

3. The apparatus of claim 2 wherein said discriminator comprises;
   - a first broadband transformer having a primary and a secondary winding;
   - a second broadband transformer having a primary and a center-tapped secondary winding;
   - a first diode, a center-tapped resistor and a second diode connected respectively, in series with the secondary of said second transformer;
   - the secondary of said first transformer being connected between said center tap of said second transformer and said center tap of said resistor;

said first and second transformer primaries being said first and second inputs respectively of said discriminator;

filtering means connected to the junction of said series-connected first diode and resistor;

said junction of said diode and resistor being said output of said discriminator.

4. Apparatus for synchronizing the scanning rate of a facsimile chart recorder with the carrier frequency of a facsimile signal to be recorded thereon comprising;

a chart facsimile recorder having a synchronous AC drive motor wherein said motor speed is proportional to the frequency of an AC signal applied to said motor and the scanning rate of said recorder is dependent on said motor speed;

a source of amplitude-modulated-carrier facsimile video signals;

means for limiting the amplitude modulations of said carrier signal;

a variable-frequency local oscillator having a natural uncorrected frequency and coupled to said drive motor for supplying said motor with a drive signal;

means for comparing the frequency of said local oscillator with the frequency of said limited carrier signal and producing an error signal proportional to any frequency difference;

means for coupling said error signal to said variable frequency local oscillator for varying the frequency of said oscillator around its natural frequency in response to said error signal;

whereby said local oscillator is caused to have an output frequency equal to the frequency of said carrier signal.

5. The apparatus of claim 4 further including;

means for adjusting the natural frequency of said oscillator.

6. The apparatus of claim 5 wherein the nominal drive frequency of said drive motor is substantially less than the frequency of said local oscillator and further including;

frequency divider means coupled between said local oscillator and said drive motor for reducing the frequency of said local oscillator.

References Cited

UNITED STATES PATENTS

| | | | |
|---|---|---|---|
| 2,512,647 | 6/1950 | Hester | 178—69.5 |
| 2,987,574 | 6/1961 | Gatfield et al. | 178—69.5 |

OTHER REFERENCES

Jones: Facsimile, pp. 150–151 (1949), TK6600 J.6 C.2.

ROBERT L. GRIFFIN, *Primary Examiner.*

R. L. RICHARDSON, *Assistant Examiner.*